Dec. 31, 1957  M. A. BERGSTEDT ET AL  2,818,349
ADHESIVE SHEET PRODUCT AND METHOD OF MAKING
Filed Aug. 17, 1954
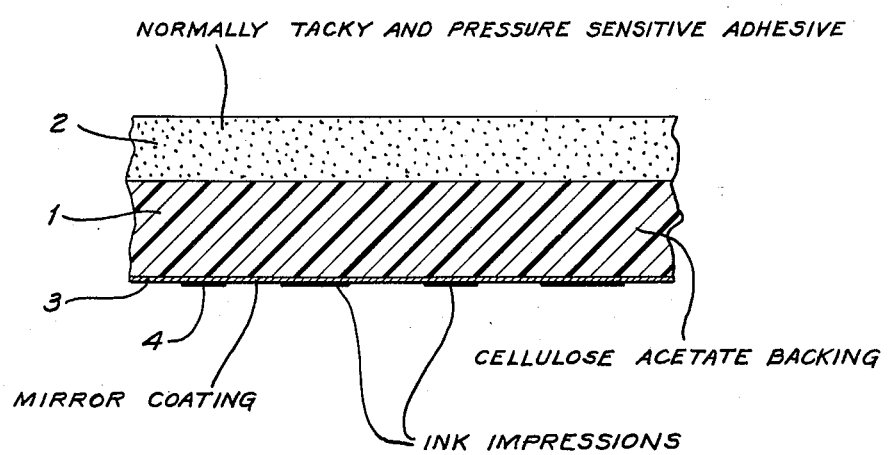
INVENTORS,
MILTON ALFRED BERGSTEDT,
BURL WARD KEYS, JR.
BY
Morgan, Finnegan, Durham & Pine
ATTORNEY

United States Patent Office 2,818,349
Patented Dec. 31, 1957

2,818,349

ADHESIVE SHEET PRODUCT AND METHOD OF MAKING

Milton Alfred Bergstedt, Linden, and Burl Ward Keys, Jr., Highland Park, N. J., assignors to Permacel-Le Page's Inc., a corporation of New Jersey Application August 17, 1954, Serial No. 450,547

7 Claims. (Cl. 117—14)

This invention relates to printed adhesive tape and to adhesive tapes suitable for printing and processes of making adhesive tape suitable for printing and of printing adhesive tape. The invention is concerned particularly with normally tacky and pressure-sensitive non-fibrous film-backed adhesive tapes, the best known of which have adhesives of the rubber-resin type, out which may also be composed of polymers incorporating both rubbery and resinous properties within the polymer. In preferred aspects it is concerned with normally tacky and pressure-sensitive adhesive tape that is wound up in a roll with contact between adhesive coated and the adhesive-free sides of adjacent convolutions in the roll, and that is unwound thereafter before use.

Film-backed normally tacky and pressure-sensitive adhesive tapes have always been difficult to print. When the usual film-backed tape is printed, the print offsets when the tape is rolled and unrolled, particularly if the printed tape is retained in roll form for prolonged periods of time or at elevated temperatures. In many cases printing increases adhesion to backing to such an extent that the film tape breaks and tears during unrolling or use. Theoretically it may be possible to anchor the print by applying double coats, one before and one after printing, or by isolating the printing between two films, laminated so as to prevent contact between the adhesive and the printing layer. Constructions of these types, however, are costly and result in bulky, unduly thick tapes that are unsightly and inconvenient to use, if not inoperative. In addition, in such constructions the printing tends to run, so that a poorly defined impression results after overcoating and lamination.

It is an object of the invention to provide products and processes resulting in an ink impression anchored so tightly that no overcoating is necessary. A further object of the invention is provision of normally tacky and pressure-sensitive printed film tape wherein ink lifting and ink transfer are prevented even when the ink impression is in direct contact with strong adhesive. A still further object is provision of ink impressions on tape that are adapted to withstand a wide variety of conditions. Yet a further object is provision of an economical process for efficient pressure-sensitive film tape printing and of economical, efficient film tape for printing and printed film tape. Still further objects of the invention will be readily apparent from the following description of the invention, which shows several preferred forms of the invention furnished by way of example only and not to limit the scope of the invention.

The drawing shows diagrammatically the printed adhesive tape prepared in accordance with the invention. In the drawing, 1 is the cellulose acetate backing, 2 is the normally tacky and pressure-sensitive adhesive, 3 is the mirror coating, and 4 is the ink impression.

In accordance with the invention, printed film tape is made by coating the film on one side with the adhesive coating or combination of coatings, which may include a primer for the adhesive, for instance as shown in Bemmels Patent No. 2,647,843, issued August 4, 1953, and mirror coated on the other side with a patternless, substantially wax- and plasticizer-free fine polymeric coating. This mirror coating involves applying on the film side opposed to the adhesive a very thin coating, using pattern-free solvent combinations. The mirror-coated film may then be printed directly on the mirror coating, preferably using inks having a resinous binder, sometimes also called flexigraphic inks.

The preferred backing film of the invention is a moisture-sensitive film, usually plasticized. Said films are the ones most difficult to print successfully and permanently in absence of the invention, particularly when the finished printed product encounters conditions of relatively high humidity. For many purposes cellulose acetate is preferred, although the invention may be applied to other highly moisture-sensitive, flexible, high tensile films. Backings involving combinations of films with strands, fibers, fiber webs, e. g. paper or non-woven fabric, or other films may be substituted for plain films, provided that the smooth film with the mirror coating appears on the side available to accept the printing impression. The preferred film is cellulose acetate film of a thickness of from about one-half to about two and one-half mils, plasticized with from about five to about forty percent of its weight of plasticizer, usually of the liquid ester type, e. g., di-butyl phthalate.

The preferred mirror coating is applied by knife coating, finely etched roll, kiss coating or release or reverse roll coating to a coating weight preferably not more than one-quarter of one ounce per square yard, and for good results not more than half of one ounce per square yard, and comprises a material in its substantially unplasticized wax-free state having affinity for the moisture-sensitive film, preferably the lower alkyl methacrylate polymers, for best results ethyl methacrylate polymer, or nitrocellulose. Among the lower methacrylates that may also be used are methyl methacrylate, propyl methacrylate, butyl methacrylate, pentyl methacrylate, hexyl methacrylate, heptyl methacrylate and octyl methacrylate. The lowest methacrylates are generally more brittle than the higher ones, and therefore mirror coatings using ethyl or methyl methacrylate should be applied to lower coating weights than mirror coatings of, say, heptyl and octyl methacrylate.

The mirror coatings may be applied from mixed solvents, and part of the mixed solvent should for best results be a true solvent for cellulose acetate, permitting the mirror coating solution to "bite" into the sheet. Within the above-stated coating weight limits the mirror coating thickness that is preferred depends upon the inherent flexibility or brittleness of the coating materials, while a continuous coating as thin as possible without pattern formation is generally most desirable.

The printing ink used may be any ink having a resinous binder, sometimes called flexigraphic ink. Among preferred inks are inks based on binders such as shellac, ethyl cellulose and nitrocellulose. Among preferred solvents for the ink are the lower aliphatic alcohols and the lower aliphatic esters, e. g., ethyl acetate. The amount and type of solvent is regulated so as to give the ink the desired drying speed and degree of penetration.

Typical inks are:

INK EXAMPLE A

|  | Parts by weight |
|---|---|
| Victoria blue R 275 (Color Index 728) | 20 |
| Ethyl cellulose | 5 |
| Dissolved in methylated spirit | 175 |

INK EXAMPLE B

|  |  |
|---|---|
| Diacetone alcohol | 200 |
| National nigrosine base N | 20 |
| Orange shellac | 80 |

INK EXAMPLE C

| | Parts by weight |
|---|---|
| Methylated spirit | 87 |
| Ethyl cellulose | 8 |
| White shellac | 20 |
| Titanium oxide | 45 |

(The above milled to smooth paste.)
Add:

| | |
|---|---|
| Ethyl cellulose | 26 |
| Dissolved in methylated spirits | 60 |
| Followed by methyl violet 2B | 8 |
| And rotor violet BG | 8 |
| Dissolved in methylated spirits | 64 |
| Add methylcyclohexanone | 33 |

And mix thoroughly.

Examples of preferred forms of the invention follow:

Example I

A two-mil cellulose acetate film known as P–912 was coated with a primer composed of butadiene-acrylonitrile copolymer mixed with butadiene-styrene copolymer in accordance with Bemmels Patent 2,647,843, patented August 4, 1953, to form a primer coat weighing, dry, two-tenths of one ounce per square yard. The film was then mirror coated on the side opposed to the primer with a patternless coating of one-tenth of one ounce dry weight of waxless, substantially unplasticized ethyl methacrylate applied from a ten percent by weight solution in one part of ethyl acetate per five parts of toluene. After drying of primer and mirror coating, the primed side was super-coated to a coating weight of one ounce per square yard with a normally tacky and pressure-sensitive adhesive mass of the following formulation:

| | Parts by weight |
|---|---|
| Crude natural rubber, pale crepe, well broken down | 39 |
| Rosin, dehydrogenated | 30 |
| Filler such as zinc oxide and aluminum hydrate | 30 |
| Antioxidant | 1 |

Very good results were obtained on printing this adhesive tape on the mirror coating, using resin bonded inks and any conventional printing process. Amounts of ink sufficient to give very good legibility and solid, dark impressions did not transfer, even after prolonged storage of the tape and under conditions of relatively high humidity.

Example II

Adhesive tape was made substantially in the manner of Example I except that the mirror coating was applied by a knife coater and comprised one-half second nitrocellulose, applied without creating a pattern on the cellulose acetate side of a combined backing composed of .00088 inch cellulose acetate film laminated by rubber-resin pressure-sensitive adhesive to two-mil manila rope paper. The coating was applied in absence of wax, to a dry coating weight of two-tenths of an ounce per square yard, using a solvent composition comprising equal parts by weight of butyl alcohol and ethyl acetate. The following normally tacky and pressure-sensitive adhesive was applied after mirror coating in a tandem operation:

| | Parts by weight |
|---|---|
| A 75% butadiene, 25% styrene copolymer, well broken down from a Mooney value of 70 | 10 |
| Crude smoked sheet rubber | 20 |
| Titanium dioxide filler | 20 |
| Lanolin | 7 |
| Phenol-modified terpene resin | 25 |
| Antioxidant | 2 |
| Red pigment | 6 |

Very good, durable printing resulted in this case.

Example III

A two-mil cellulose acetate film plasticized to the extent of twenty percent with a plasticizer of the di-methoxyethyl phthalate type, or other plasticizer with high boiling point and extremely low volatility, was used. To this film were applied in one coating and drying operation a butadiene-acrylonitrile-copolymer-butadiene-styrene-copolymer primer in accordance with the aforementioned Bemmels patent, and also a patternless mirror coating comprising a waxless, substantially unplasticized one-second nitrocellulose solution consisting of forty parts by weight butyl alcohol, forty parts ethyl acetate and twenty parts toluene. The primer and the mirror coating were applied to opposite sides of the film, the primer to a coating weight of two-tenths of an ounce per square yard and the mirror coating to a coating weight of .001 of an ounce per square yard. Using nitrocellulose bonded flexigraphic ink, very satisfactory, secure, permanent impressions resulted on the mirror coating.

Either before or after printing, an adhesive was applied to the primed side of the backing, to a coating weight of one and one-half ounces per square yard, comprising the following formula:

| | Parts by weight |
|---|---|
| Crude natural rubber, well broken down on the rubber mill | 60 |
| Oil-modified phenolic resin | 2 |
| Hydrogenated rosin glyceride | 35 |
| Alkylated polyhydroxy phenol | 0.6 |
| Lecithin | 2 |

Example IV

This product was prepared in every respect the same as Example I, except that the backing and initial or primer coat were prepared as follows: One and one-half mil commercial grade cellulose acetate film was coated with a bonding coat composed of ten parts by weight of butadiene acrylonitrile polymer having a Mooney viscosity of fifty, and ten parts by weight of GR–S X245 butadiene styrene copolymer. The first copolymer was composed of seventy-five percent by weight butadiene and twenty-five percent acrylonitrile. The second copolymer was composed of fifty parts by weight of butadiene and fifty parts by weight of styrene and had a Mooney viscosity of approximately 40–50. The bonding coat was applied from twenty percent by weight toluene solution to a coating weight of one ounce per square yard. To this bonding coat were applied forty strands per inch of fifty-five denier cellulose acetate, fifteen filaments per strand, having a twist of five turns per inch. To this coated combined backing was applied a normally tacky and pressure-sensitive adhesive composition comprising the following parts by weight:

| | Parts by weight |
|---|---|
| Smoked sheet natural rubber | 10 |
| Zinc oxide | 8 |
| Hydrogenated coumarone-indene resin, melting point 70° C | 8 |
| Lanolin | 3 |
| Alkylated polyhydroxy phenol as age resistor | 0.3 |
| Toluene | 70.7 |

The mirror coating employed was ethyl metacrylate polymer applied from a solution comprising forty parts by weight of ethyl methacrylate polymer in sixty parts by weight ethyl acetate and three hundred parts by weight of toluene. The mirror coating was applied using an etched print roll. Using a knife coating, a solution of forty parts by weight ethyl methacrylate polymer in sixty parts by weight of ethyl acetate is preferred.

Example V

This example was prepared in every respect the same as Example II, except that the one-half second nitrocellulose was slightly plasticized, using three per cent by weight di-octyl phthalate.

The invention has been described in its preferred form, and many modifications thereof are included within its spirit.

We claim:

1. A normally tacky and pressure-sensitive adhesive sheet comprising a pressure-sensitive adhesive united to one surface of a flexible, non-fibrous, cellulose acetate backing film, and, united to the other surface of said backing, a continuous mirror coating comprising at least a major proportion of at least one member of the group consisting of the lower alkyl methacrylates and nitrocellulose, and, applied directly to said continuous mirror coating, resinous binder ink impressions, said sheet being in package form wherein the printed side of said mirror coating directly contacts said adhesive.

2. In the process of preparing printed cellulose acetate film-backed normally tacky and pressure-sensitive adhesive tape, the steps of preparing the adhesive tape backing for a resinous binder ink impression by pre-coating the ink receiving surface of said backing with a thin, continuous, mirror coating comprising at least a major proportion of at least one member selected from the group consisting of the lower alkyl methacrylates and nitrocellulose, and applying resinous binder ink impressions on said mirror coating.

3. The process of claim 2 wherein said mirror coating comprises a lower methacrylate polymer.

4. A process in accordance with claim 2 wherein said mirror coating comprises ethyl methacrylate polymer.

5. A product in accordance with claim 1 wherein said mirror coating comprises a lower alkyl methacrylate polymer.

6. A product in accordance with claim 1 wherein said mirror coating comprises ethyl methacrylate polymer.

7. A product in accordance with claim 1 wherein said mirror coating is composed of nitrocellulose.

References Cited in the file of this patent

UNITED STATES PATENTS

| | | |
|---|---|---|
| 2,269,712 | Drew | Jan. 13, 1942 |
| 2,438,195 | Tierney | Mar. 23, 1948 |
| 2,599,576 | Morris | June 10, 1952 |
| 2,607,711 | Hindricks | Aug. 19, 1952 |
| 2,656,286 | Fisher | Oct. 20, 1953 |